US011371564B2

(12) United States Patent
Sugiyama (10) Patent No.: US 11,371,564 B2
(45) Date of Patent: Jun. 28, 2022

(54) PLUNGING TYPE CONSTANT VELOCITY UNIVERSAL JOINT

(71) Applicant: NTN CORPORATION, Osaka (JP)

(72) Inventor: Tatsuro Sugiyama, Shizuoka (JP)

(73) Assignee: NTN CORPORATION, Osaka (JP)

(*) Notice: Subject to any disclaimer, the term of this patent is extended or adjusted under 35 U.S.C. 154(b) by 229 days.

(21) Appl. No.: 16/485,984

(22) PCT Filed: Jan. 25, 2018

(86) PCT No.: PCT/JP2018/002216
§ 371 (c)(1),
(2) Date: Aug. 14, 2019

(87) PCT Pub. No.: WO2018/150836
PCT Pub. Date: Aug. 23, 2018

(65) Prior Publication Data
US 2020/0063802 A1  Feb. 27, 2020

(30) Foreign Application Priority Data

Feb. 16, 2017  (JP) .............................. JP2017-026884

(51) Int. Cl.
*F16D 3/227* (2006.01)
*F16D 3/06* (2006.01)
(Continued)

(52) U.S. Cl.
CPC ............. *F16D 3/227* (2013.01); *F16D 3/065* (2013.01); *F16D 3/2237* (2013.01);
(Continued)

(58) Field of Classification Search
CPC ........ F16D 3/227; F16D 3/065; F16D 3/2237; F16D 2003/22303; F16D 2003/22309; Y10S 464/906

(Continued)

(56) References Cited

U.S. PATENT DOCUMENTS 3,488,979 A * 1/1970 Louis ..................... F16D 3/22
464/906
6,299,543 B1  10/2001 Sone et al.
(Continued)

FOREIGN PATENT DOCUMENTS

JP   10-73129    3/1998
JP   2007-85488  4/2007
(Continued)

OTHER PUBLICATIONS

Universal Joint and Driveshaft Design Manual, AE-7, Society of Automotive Engineers, Inc., Warrendale, PA, Section 3.2.13, TJ1079. S62. (Year: 1979).*

(Continued)

*Primary Examiner* — Greg Binda
(74) *Attorney, Agent, or Firm* — Wenderoth, Lind & Ponack, L.L.P.

(57) ABSTRACT

A double-offset plunging type constant velocity universal joint includes inner and outer joint members each having six linear track grooves extending along an axial direction. The inner joint member has a coupling hole at a center portion thereof for coupling a shaft. Six torque transmission balls retained by a cage are incorporated between the linear track grooves of the inner and outer joint members. A ratio $T_{CAGE}/D_{BALL}$ of a minimum thickness ($T_{CAGE}$) of the cage to a diameter of the torque transmission ball ($D_{BALL}$) is from 0.225 to 0.245, wherein a ratio $D_{BALL}/D_S$ of a diameter ($D_{BALL}$) of the torque transmission ball to a spline large diameter ($D_S$) of the coupling hole of the inner joint member is from 0.79 to 0.85, and wherein a ball contact ratio ($\psi$) of the torque transmission ball is from 1.08 to 1.12.

4 Claims, 11 Drawing Sheets

(51) Int. Cl.
  *F16D 3/2237*  (2011.01)
  *F16D 3/223*  (2011.01)
(52) U.S. Cl.
  CPC .............. *F16D 2003/22303* (2013.01); *F16D 2003/22309* (2013.01); *Y10S 464/906* (2013.01)
(58) Field of Classification Search
  USPC ........................................................ 464/146
  See application file for complete search history.

(56) References Cited

U.S. PATENT DOCUMENTS

| | | | |
|---|---|---|---|
| 7,544,132 B2* | 6/2009 | Schaaf | F16D 3/223 |
| | | | 464/146 |
| 2009/0136287 A1 | 5/2009 | Kobayashi et al. | |
| 2010/0130290 A1 | 5/2010 | Yamase | |
| 2020/0018356 A1* | 1/2020 | Kobayashi | F16D 3/2245 |

FOREIGN PATENT DOCUMENTS

| | | |
|---|---|---|
| JP | 2008-275131 | 11/2008 |
| JP | 5073190 | 11/2012 |

OTHER PUBLICATIONS

International Pretirainaty Repots on Patentability dated Aug. 20, 2019 in international (PCT) Application No. PCT/JP2018/002216.
International Search Report dated Apr. 17, 2018 in International (PCT) Application No. PCT/JP2018/002216.

* cited by examiner

PLUNGING TYPE CONSTANT VELOCITY UNIVERSAL JOINT

TECHNICAL FIELD

The present invention relates to a plunging type constant velocity universal joint, which is to be used for automobiles and various industrial machines.

BACKGROUND ART

In recent years, variation in automobiles has been rapidly increased. Along with such increase in variation, there has been an increasing need for a drive shaft having new functions and increased range of use.

With regard to a drive shaft for an automobile, typically, a fixed type constant velocity universal joint is used on a drive wheel side (also referred to as "out-board side"), and a plunging type constant velocity universal joint is used on a differential side (also referred to as "in-board side"). The two constant velocity universal joints are coupled to each other through intermediation of an intermediate shaft. The fixed type constant velocity universal joint is capable of forming a large operating angle but does not slide in an axial direction. Meanwhile, the plunging type constant velocity universal joint is slidable in the axial direction, but is not capable of forming a large operating angle.

Specifically, the fixed type constant velocity universal joint used on the drive wheel side has a maximum allowable angle of the joint which is set within the range of from 46° to 50° so as to deal with an angle given at the time of full steering. Meanwhile, the plunging type constant velocity universal joint used on the differential side is set within the range of from 23° to 30° so as to absorb movement of a suspension. In the plunging type constant velocity universal joint, when there is given a full bound state in which the suspension is maximally compressed or a full rebound state in which the suspension is maximally extended, the maximum operating angle is formed.

In general, for example, a sport utility vehicle (SUV) having a vehicle height higher than that of a passenger vehicle has a large angle of a drive shaft in a flat-ground traveling state (hereinafter referred to as "normal operating angle"), and movement of the suspension tends to be larger. In an all-terrain vehicle (ATV), the normal operating angle of the drive shaft tends to be larger.

With regard to a double-offset plunging type constant velocity universal joint (hereinafter sometimes simply referred to as "DOJ") which is one type of the plunging type constant velocity universal joint, those having six torque transmission balls and those having eight balls are produced and made available in the market. The maximum operating angle of the DOJ is roughly classified into two types including an angle equal to or smaller than 25° and an angle larger than 25° and equal to or smaller than about 32°. Those having the maximum operating angle equal to or smaller than 25° are classified into a six-ball type and an eight-ball type, and the eight-ball type is more compact.

The DOJ having the maximum operating angle larger than 25° and equal to or smaller than about 32° includes only the six-ball type to secure the joint load capacity and the strength of the cage pillar portions at the time of forming a large angle. Thus, an outer diameter of an outer joint member is also larger by about one size (4% to 6%) than the type having the maximum operating angle equal to or smaller than 25°. There has been proposed a DOJ which achieves a large maximum operating angle larger than 25° and equal to or smaller than about 32° and downsizing (Patent Document 1).

PRIOR ART DOCUMENTS

Patent Documents

Patent Document: JP 5073190 B2

SUMMARY OF THE INVENTION

Problems to be Solved by the Invention

With regard to automobiles in the future, there is a possibility that not only the increase in variation of the suspension but also significant changes in layout of the entirety of drive system components including an engine may occur. In consideration of such possibility, it is expected that the maximum operating angle of the plunging type constant velocity universal joint is required to be increased to about 40°. However, the maximum operating angle of about 40° falls within the range of the operating angle of the fixed type constant velocity universal joint, and such range of the maximum operating angle falls within an unprecedented range which cannot be achieved with the related-art plunging type constant velocity universal joint.

The following is the main reason. Specifically, the DOJ has a structure in which an outer joint member and an inner joint member each have linear track grooves extending in an axial direction. Therefore, when a large operating angle around 40° is formed, a movement amount of balls in a radial direction within pockets of a cage becomes significantly larger. According to a conventional way of thinking, it has been a conventional technical knowledge that a compact and practically applicable DOJ cannot be achieved with such configuration. The present invention has been made in an attempt to overcome such technical common knowledge.

In view of the above-mentioned problem, the present invention has an object to provide a plunging type constant velocity universal joint, which reliably achieves downsizing of the plunging type constant velocity universal joint and significantly increases an operating angle, and thus increases a usable range of an angle of a drive shaft and improves a degree of freedom in layout of drive system components, thereby being capable of significantly contributing to increase in variation of automobile designs.

Solution to the Problems

As a result of extensive studies and tests to achieve the above-mentioned object, the inventor of the present invention obtained the knowledge that organically associated internal specifications including a ratio of a ball diameter to a thickness of a cage, a ratio of a ball diameter to a spline large diameter, and a contact ratio of a ball with respect to a track groove serve as key elements, and achieved the present invention with new conception of setting those organically associated internal specifications to be qualitatively different from those of the related art.

According to the subject application which has been made to solve the problem described above, there is provided a plunging type constant velocity universal joint, comprising: an outer joint member comprising a cylindrical inner peripheral surface having six linear track grooves extending along an axial direction; an inner joint member comprising a spherical outer peripheral surface having six linear track grooves being opposed to the linear track grooves of the outer joint member and extending along the axial direction, the inner joint member having a coupling hole at a center portion thereof for coupling a shaft; six torque transmission balls incorporated between the linear track grooves of the outer joint member and the linear track grooves of the inner joint member; and a cage, which is configured to retain the torque transmission balls, and comprises a spherical outer peripheral surface and a spherical inner peripheral surface, which are guided in contact with the cylindrical inner peripheral surface of the outer joint member and the spherical outer peripheral surface of the inner joint member, respectively, wherein a curvature center of the spherical outer peripheral surface of the cage and a curvature center of the spherical inner peripheral surface are offset toward opposite sides in the axial direction with respect to a joint center, wherein a ratio $T_{CAGE}/D_{BALL}$ of a minimum thickness ($T_{CAGE}$) of the cage to a diameter of the torque transmission ball ($D_{BALL}$) is set within a range of from 0.225 to 0.245, wherein a ratio $D_{BALL}/D_S$ of a diameter ($D_{BALL}$) of the torque transmission ball to a spline large diameter ($D_S$) of the coupling hole of the inner joint member is set within a range of from 0.79 to 0.85, and wherein a ball contact ratio ($\Psi$) of the torque transmission ball is set within a range of from 1.08 to 1.12.

With the above-mentioned structure, a plunging type constant velocity universal joint, which reliably achieves downsizing of the plunging type constant velocity universal joint and significantly increases an operating angle, and thus increases a usable range of an angle of a drive shaft and improves a degree of freedom in layout of drive system components, thereby being capable of significantly contributing to increase in variation of designs of automobiles can be provided.

Specifically, when a maximum operating angle of the plunging type constant velocity universal joint is equal to or larger than 39°, the plunging type constant velocity universal joint is suitable for SUV and ATV which tend to be increased in normal operating angle.

When an inclination angle S of a stopper surface connecting to the spherical outer peripheral surface of the cage is equal to or larger than 19.5°, the maximum allowable angle of the plunging type constant velocity universal joint which allows the maximum operating angle equal to or larger than 39° can be restricted.

Effects of the Invention

According to the present invention, a plunging type constant velocity universal joint, which reliably achieves downsizing of the plunging type constant velocity universal joint and significantly increases an operating angle, and thus increases a usable range of an angle of a drive shaft and improves a degree of freedom in layout of drive system components, thereby being capable of significantly contributing to increase in variation of designs of automobiles can be provided.

BRIEF DESCRIPTION OF DRAWINGS

FIG. 1b is a transverse sectional view taken along the line A-A of FIG. 1a.

FIG. 2a is a longitudinal sectional view of an outer joint member of FIG. 1a.

FIG. 2b is a transverse sectional view taken along the line A-A of FIG. 2a.

FIG. 3a is a right side view of an inner joint member of FIG. 1a.

FIG. 3b is a longitudinal sectional view taken along the line B-N-B of FIG. 3a.

FIG. 4b is a transverse sectional view taken along the line E-E of FIG. 4a.

EMBODIMENTS OF THE INVENTION

Figure 1A:
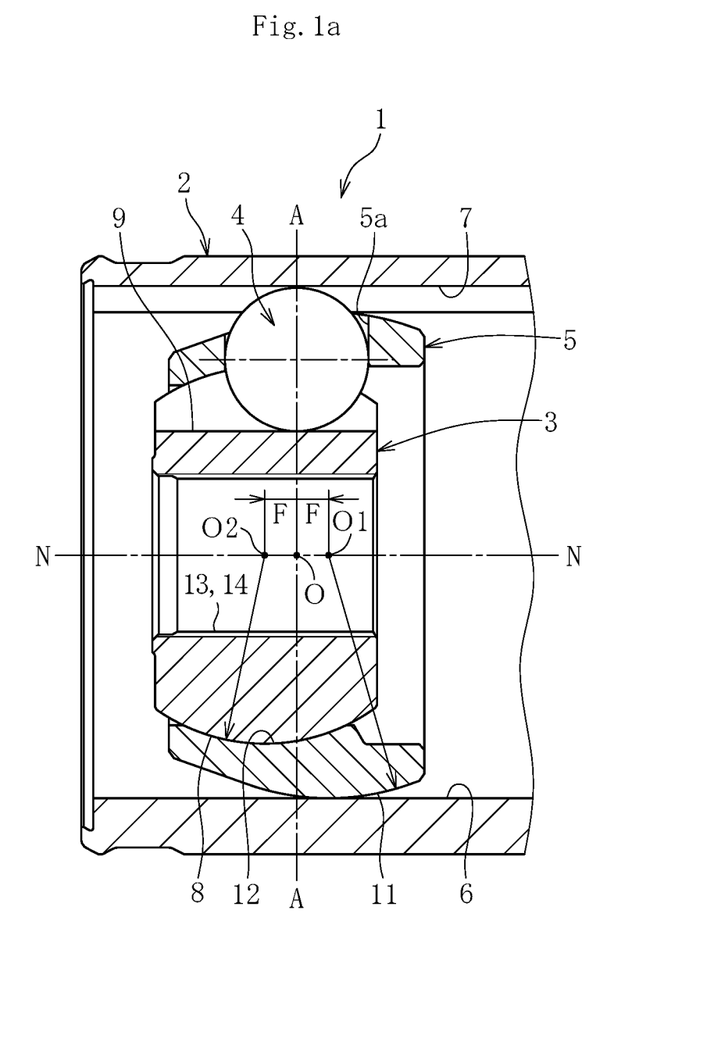
FIG. 1a is a longitudinal sectional view of a plunging type constant velocity universal joint according to one embodiment of the present invention taken along the line D-N-D of FIG. 1b.
Figure 1B:
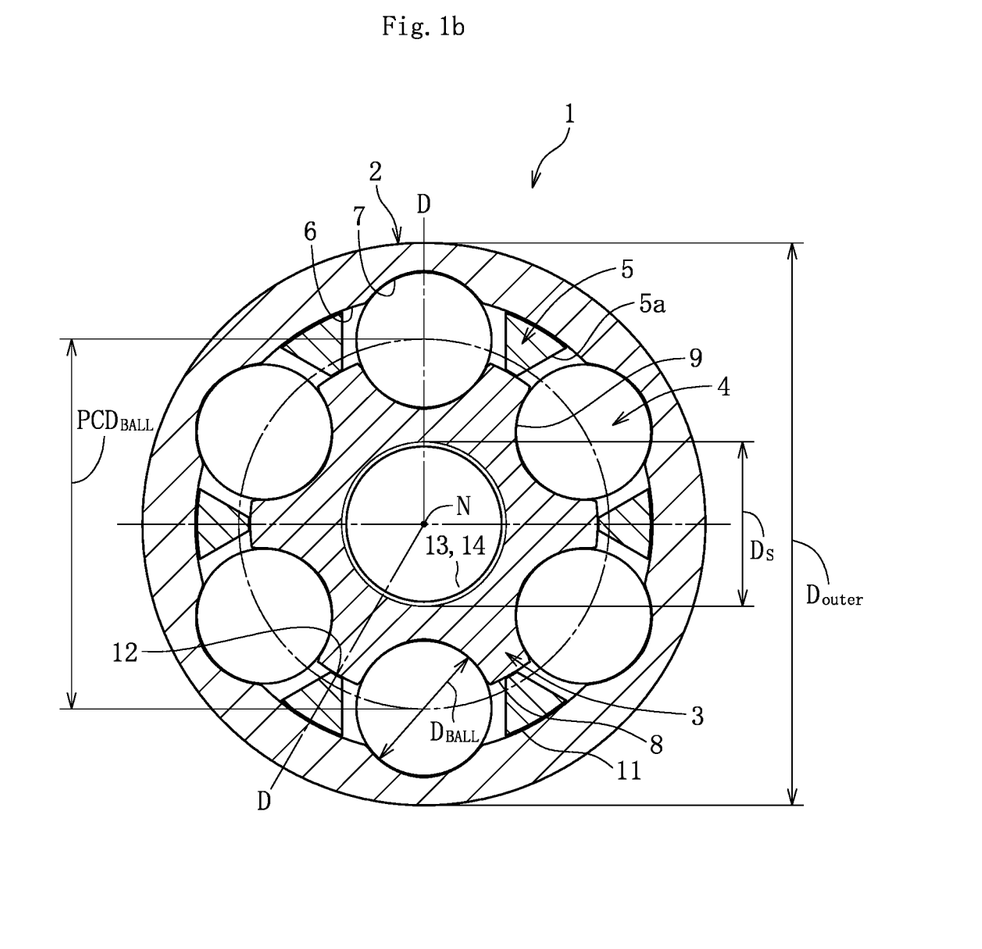
Figure 2A:
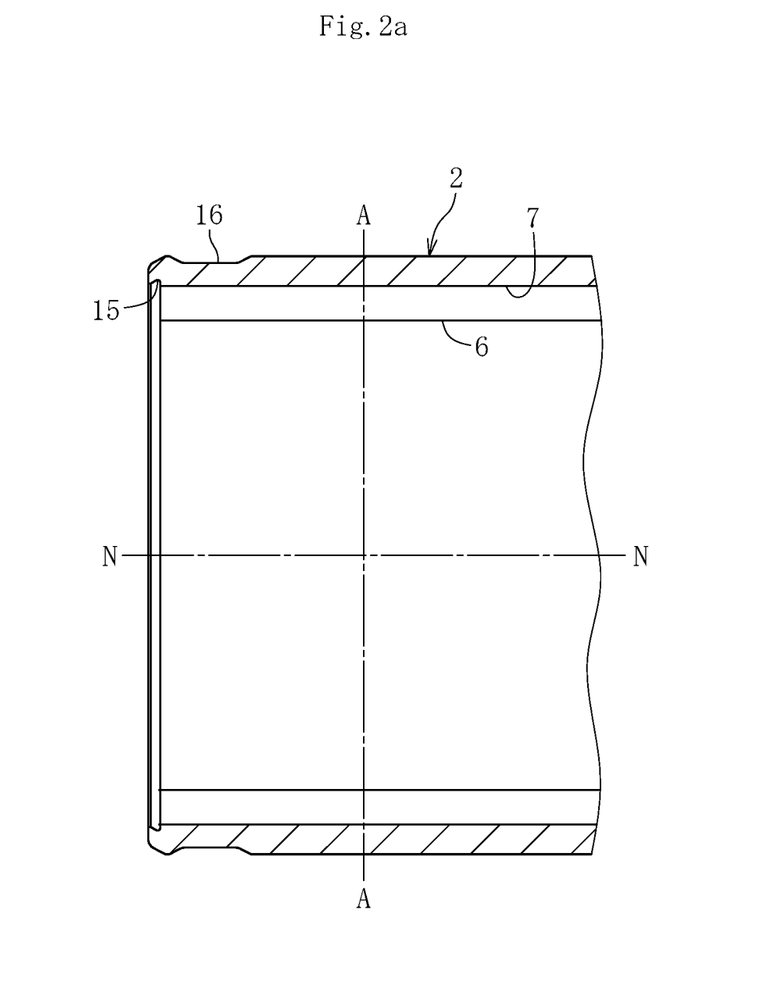
Figure 2B:
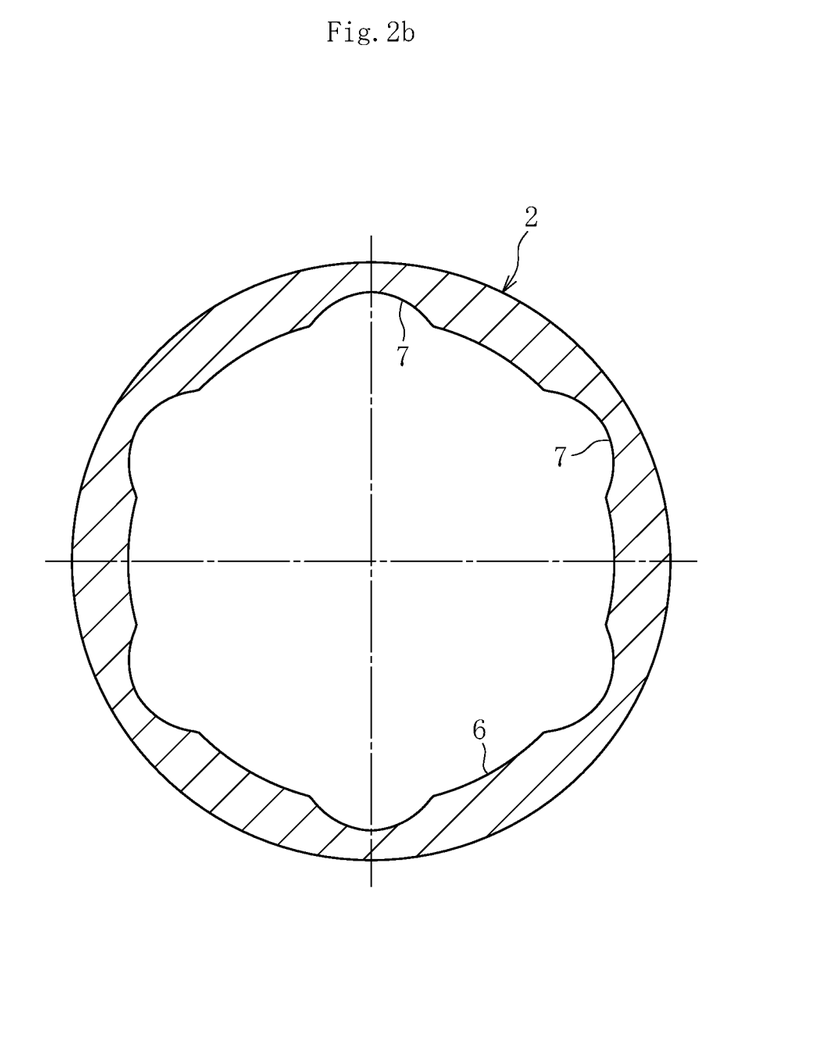
Figure 3A:
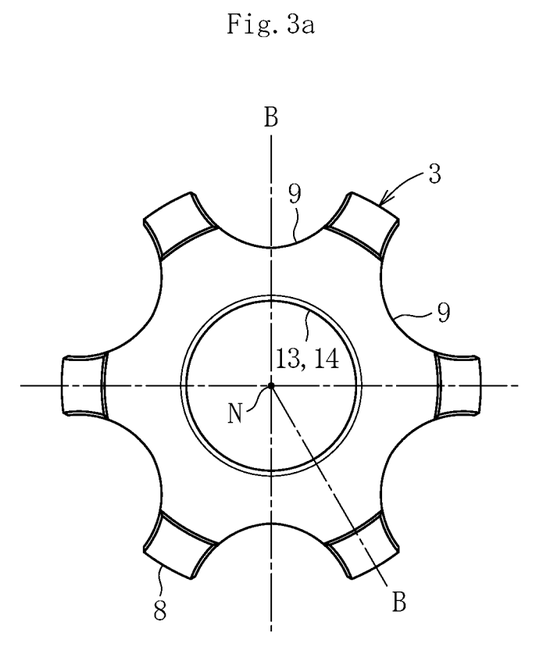
Figure 3B:
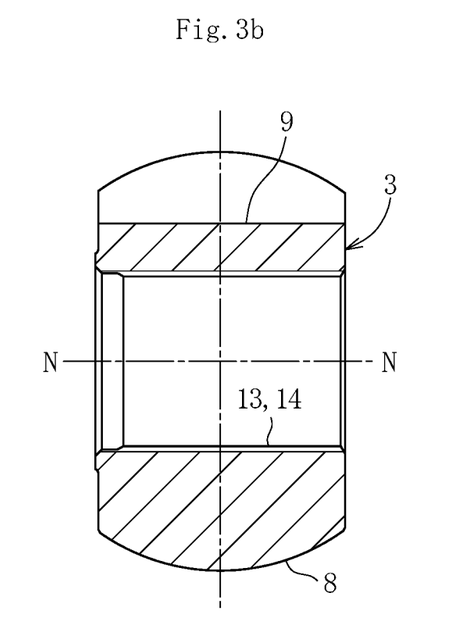
Figure 4A:
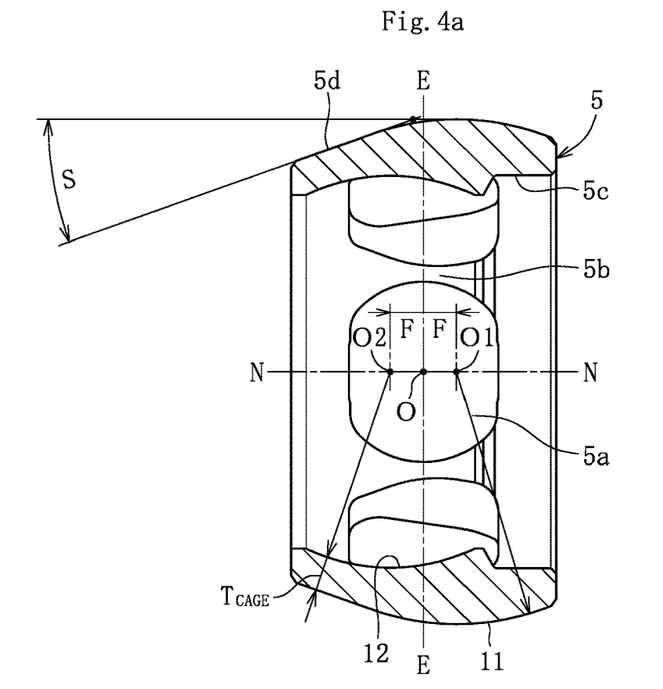
FIG. 4a is an illustration of a cage of FIGS. 1a and 1s a longitudinal sectional view taken along the line C-C of FIG. 4b.
Figure 4B:
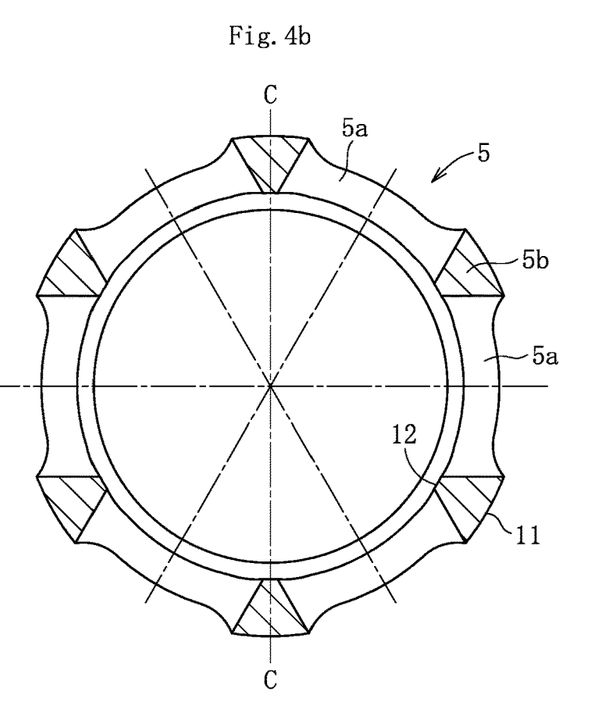

A plunging type constant velocity universal joint according to one embodiment of the present invention is described with reference to FIG. 1 to FIG. 8. FIG. 1a is a longitudinal sectional view of a plunging type constant velocity universal joint according to this embodiment taken along the line D-N-D of FIG. 1b, and FIG. 1b is a transverse sectional view taken along the line A-A of FIG. 1a. FIG. 2a is a longitudinal sectional view of an outer joint member of FIG. 1a, and FIG. 2b is a transverse sectional view taken along the line A-A of FIG. 2a. FIG. 3a is a right side view of an inner joint member of FIG. 1a, and FIG. 3b is a longitudinal sectional view taken along the line B-N-B of FIG. 3a. FIG. 4a is an illustration of a cage of FIG. 1a and is a longitudinal sectional view taken along the like C-C of FIG. 4b, and FIG. 4b is a transverse sectional view taken along the line E-E of FIG. 4a.

As illustrated in FIG. 1a and FIG. 1b, a plunging type constant velocity universal joint 1 is a so-called double-offset plunging type constant velocity universal joint, and mainly comprises an outer joint member 2, an inner joint member 3, torque transmission balls 4, and a cage 5. A cylindrical inner peripheral surface 6 of the outer joint member 2 has six track grooves 7. The track grooves 7 are formed at equal intervals in a circumferential direction and linearly extend along an axial direction. A spherical outer peripheral surface 8 of the inner joint member 3 has track grooves 9 which are opposed to the track grooves 7 of the outer joint member 2. The track grooves 9 are formed at equal intervals in a circumferential direction and linearly extend along the axial direction. Six torque transmission balls (hereinafter simply referred to also as "balls") 4 are individually incorporated between the track grooves 7 of the outer joint member 2 and the track grooves 9 of the inner joint member 3. The balls 4 are received in pockets 5a of the cage 5.

The cage 5 comprises a spherical outer peripheral surface 11 and a spherical inner peripheral surface 12. The spherical outer peripheral surface 11 is fitted to and guided in contact with the cylindrical inner peripheral surface 6 of the outer joint member 2. The spherical inner peripheral surface 12 is fitted to and guided in contact with the spherical outer peripheral surface 8 of the inner joint member 3. The spherical outer peripheral surface 11 of the cage 5 has a curvature center O1. The spherical inner peripheral surface 12 has a curvature center O2. The curvature centers O1 and O2 are located on an axis line N, and are offset by equal distances F in the axial direction with respect to a joint center O. With this configuration, when the joint forms an operating angle, the balls 4 are always guided on a plane bisecting an angle formed by both axis lines of the outer joint member 2 and the inner joint member 3, thereby achieving transmission between two shafts with constant-velocity rotation.

Next, components of the plunging type constant velocity universal joint 1 are described. As illustrated in FIG. 2a and FIG. 2b, the cylindrical inner peripheral surface 6 of the outer joint member 2 has the six track grooves 7. The six track grooves 7 are formed at equal intervals in the circumferential direction and linearly extend along the axial direction. A stop ring groove 15 is formed at an opening-side end portion of the outer joint member 2, and a stop ring (not shown) is mounted to the stop ring groove 15, thereby preventing an inner assembly illustrated in FIG. 1a comprising the inner joint member 3, the balls 4, and the cage 5 from moving out from the opening-side end portion of the outer joint member 2. The opening-side end portion of the outer joint member 2 has, on an outer periphery thereof, a boot-mounting groove 16.

As illustrated in FIG. 3a and FIG. 3b, the spherical outer peripheral surface 8 of the inner joint member 3 has the six track grooves 9. The track grooves 9 are formed at equal intervals in the circumferential direction and linearly extend along the axial direction. The spherical outer peripheral surface 8 has the linear track grooves 9, and hence a groove depth of each of the track grooves 9 becomes smaller as extending from a center of the inner joint member 3 in the axial direction toward both ends. A spline (including serration, which similarly applies to the following description) 14 is formed on a coupling hole 13 of the inner joint member 3. A shaft end portion of the intermediate shaft 27 (see FIG. 8) is spline-fitted to the coupling hole 13, and is fixed by a shoulder portion of the intermediate shaft 27 and the stop ring in the axial direction. In the plunging type constant velocity universal joint 1 according to this embodiment, in order to allow a large operating angle around 40° (hereinafter referred to also as "super-large operating angle"), the inner joint member 3 has an axial width which is set longer than that of a related-art product.

As illustrated in FIG. 4a and FIG. 4b, the cage 5 comprises the spherical outer peripheral surface 11 and the spherical inner peripheral surface 12. The curvature center O1 of the spherical outer peripheral surface 11 and the curvature center O2 of the spherical inner peripheral surface 12 are offset by the equal distances F in the axial direction with respect to the joint center (axial center of the cage) O. Six pockets 5a are formed on the axial center of the cage 5 indicated by the line E-E at equal intervals in a circumferential direction, and pillar portions 5b are each provided between adjacent pockets 5a. A cutout 5c for receiving the inner joint member 3 to be incorporated therein is formed along an inner periphery of a large-diameter-side end portion of the cage 5. A stopper surface 5d of the cage 5 has a conical shape so that the stopper surface 5d is tangentially connected to the spherical outer peripheral surface 11. An inclination angle S of the stopper surface 5d with respect to a line extending tangentially from the spherical outer peripheral surface 11 at a point where a line, which passes through the joint center O and is orthogonal to the central axis of the cage 5, intersects the spherical outer peripheral surface 11 is set equal to or larger than 19.5°. With this configuration, the maximum allowable angle of the plunging type constant velocity universal joint forming the super-large operating angle can be restricted.

Next, internal specifications of the plunging type constant velocity universal joint 1 according to this embodiment are described with reference to FIG. 1a, FIG. 1b, and FIG. 5. In this embodiment, the internal specifications shown in Table 1 follow internal specifications of a related-art product which is proven.

TABLE 1

| | |
|---|---|
| (Ball diameter $D_{BALL}$)/(Outer ring outer diameter $D_{OUTER}$) | 0.21 to 0.25 |
| (Pitch circle diameter $PCD_{BALL}$ of balls)/(Outer ring outer diameter $D_{OUTER}$) | 0.64 to 0.68 |
| Ball contact angle $\alpha$ | 30° to 35° |
| (Cage offset amount F)/(Pitch circle diameter $PCD_{BALL}$ of balls) | 0.07 to 0.09 |

In the plunging type constant velocity universal joint 1 according to this embodiment which forms a super-large operating angle, even when downsizing is achieved, an outer diameter of the outer joint member 2, that is, an outer ring outer diameter $D_{OUTER}$ becomes larger than that of the related-art product by about one size (4% to 6%), and a ball diameter $D_{BALL}$ and a pitch circle diameter $PCD_{BALL}$ of balls also become larger. Therefore, in order to obtain the strength which is equivalent to that of the related-art product while securing the thickness of the outer joint member 2, a ratio of $D_{BALL}/D_{OUTER}$ and a ratio of $PCD_{BALL}/D_{OUTER}$ are set equivalent to those of the related-art product.

Moreover, the ball contact angle $\alpha$ and a ratio $F/PCD_{BALL}$ of the cage offset amount F to the pitch circle diameter $PCD_{BALL}$ of the balls 4 are set equivalent to those of the related-art product which is proven.

The transverse cross sections of the track groove 7 of the outer joint member 2 and the transverse section of the track groove 9 of the inner joint member 3 are each formed into a gothic arch shape, which is formed by a combination of two arcs, or an elliptical shape. Therefore, as illustrated in FIG. 5, the ball 4 is held in angular contact with the track groove 7 at two points C1 and C2 and with the track groove 9 at two points C3 and C4. In this embodiment, the ball contact angle $\alpha$ with respect to each of the track groove 7 of the outer joint member 2 and the track groove 9 of the inner joint member 3 is set within the range of from 30° to 35°.

Figure 5:
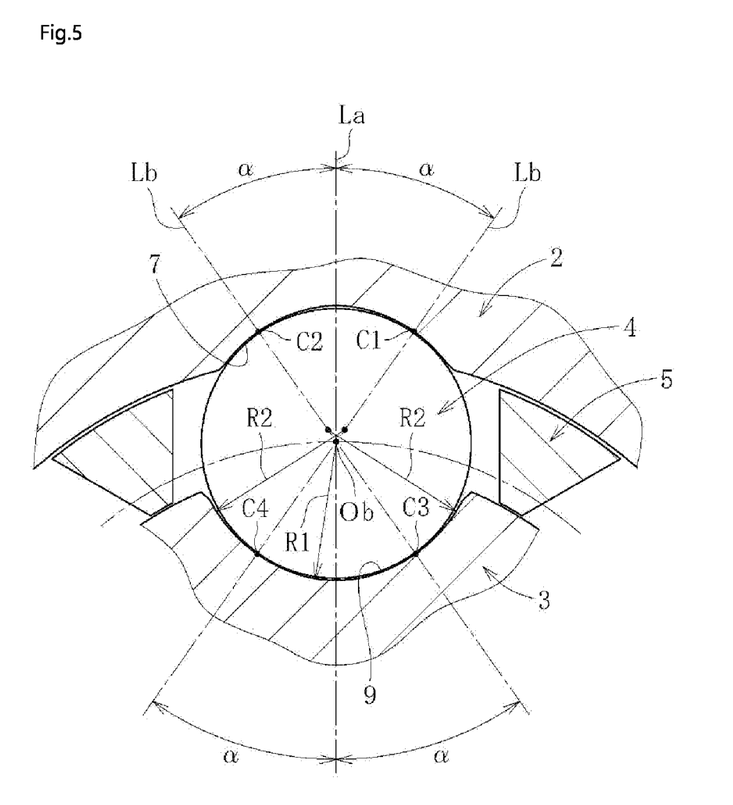
FIG. 5 is an enlarged transverse sectional view for illustrating one ball and track grooves of FIG. 1b.

The ball contact angle $\alpha$ refers to an angle $\alpha$ between a straight line La and a straight line Lb in FIG. 5. The straight line La is a center line of each of the transverse cross sections of the track grooves 7 and 9, and corresponds to the line D-N of FIG. 1b. The straight line Lb is a straight line connecting each of contact points C1, C2, C3, and C4 of the ball 4 on side surfaces of the track grooves 7 and 9 to a center Ob of the ball 4.

The plunging type constant velocity universal joint according to the present invention has the following characteristic configuration. Specifically, with the proven internal specifications described above, as shown in Table 2, the organically associated internal specifications including a ratio of a minimum thickness of the cage to a ball diameter, a ratio of the ball diameter to a spline large diameter, and a ball contact ratio are set to be qualitatively different from those of the related-art product.

TABLE 2

| Item | | Product of the present invention | Related-art product |
|---|---|---|---|
| 1 | (Cage minimum thickness $T_{CAGE}$)/ (Ball diameter $D_{BALL}$) | 0.225 to 0.245 | 0.20 to 0.22 |
| 2 | (Ball diameter $D_{BALL}$)/(Spline large diameter $D_S$) | 0.79 to 0.85 | 0.73 to 0.78 |
| 3 | Ball contact ratio $\Psi$ | 1.08 to 1.12 | 1.02 to 1.08 |

As one characteristic configuration of this embodiment, as shown in Item 1 of Table 2, the ratio $T_{CAGE}/D_{BALL}$ of the cage minimum thickness $T_{CAGE}$ to the ball diameter $D_{BALL}$ is set within the range of from 0.225 to 0.245. The cage minimum thickness $T_{CAGE}$ is measured along a line extending from the curvature center 02 of the spherical inner peripheral surface 12 through the cage 5. Such configuration is adopted to secure contact points of the ball 4 in the pocket 5a of the cage 5 at the time of forming the super-large operating angle by increasing the thickness of the cage 5. The lower limit of the ratio $T_{CAGE}/D_{BALL}$ is set to secure the contact points of the ball 4, and the upper limit is set to secure the spherical inner peripheral surface of the pillar portion 5b of the cage 5. The cage minimum thickness $T_{CAGE}$ is used as the parameter for securing the contact points of the ball 4 in the pocket 5a of the cage 5 at the time of forming the super-large operating angle because of the following reason. Specifically, the contact points of the ball 4 on the radially outer side of the cage 5 are determined based on the stopper surface 5d, and the spherical inner peripheral surface of the pillar portion 5b is secured based on the size of the spherical inner peripheral surface 12. Thus, the cage minimum thickness $T_{CAGE}$ represents a relationship between the stopper surface and the spherical inner peripheral surface 12.

Further, as shown in Item 2, the ratio $D_{BALL}/D_S$ of the ball diameter $D_{BALL}$ to the spline large diameter $D_S$ is set within the range of from 0.79 to 0.85. This indicates that the ball diameter $D_{BALL}$ is larger, but the DOJ of the six-ball type with a super-large operating angle is achieved, and the outer diameter of the outer joint member 2, that is, the outer ring outer diameter $D_{OUTER}$ is set compact. When the ratio $D_{BALL}/D_S$ is smaller than 0.79, the DOJ with the super-large operating angle cannot be achieved. When the ratio $D_{BALL}/D_S$ is larger than 0.85, downsizing cannot be achieved.

Further, as shown in Item 3, the ball contact ratio $\Psi$ is set within the range of from 1.08 to 1.12. Through the increase in ball contact ratio $\Psi$, the contact surface pressure with respect to the ball 4, which is increased in size by the super-large angle specification, is increased. Through the reduction in size of the contact ellipse of each of the track grooves 7 and 9, overriding is suppressed. As a result, the increase in ball diameter $D_{BALL}$ is prevented, and the groove depth of each of the track grooves 7 and 9 can be reduced. When the ball contact ratio $\Psi$ is smaller than 1.08, the contact ellipse may cause overriding of each of the track grooves 7 and 9. Meanwhile, when the ball contact ratio $\Psi$ is larger than 1.12, the contact surface pressure is increased, with the result that the durability equivalent to that of the related-art product cannot be obtained.

The ball contact ratio $\Psi$ is a ratio R2/R1 of a curvature radius R2 of the transverse cross section of each of the track grooves 7 and 9 to a radius R1 ($R1=D_{BALL}/2$) of the ball 4. As illustrated in FIG. 5, a curvature center of the curvature radius R2 of the track groove 9 of the inner joint member 3 is offset from a ball center Ob on the straight line Lb having the contact angle α. Although illustration is omitted, a curvature radius of the track groove 7 of the outer joint member 3 is also R2 similarly to the track groove 9 of the inner joint member 3. In this embodiment, the ball contact ratio $\Psi$ with respect to each of the track groove 7 of the outer joint member 2 and the track groove 9 of the inner joint member 3 is set within the range of from 1.08 to 1.12.

As described above, with regard to the plunging type constant velocity universal joint 1 according to this embodiment, the organically associated internal specifications including Item 1 (ratio of the minimum thickness of the cage to the ball diameter), Item 2 (ratio of the ball diameter to the spline large diameter), and Item 3 (ball contact ratio) in Table 2 are set to be qualitatively different from those of the related art. With this configuration, the downsizing of the outer diameter can be secured, and the plunging type constant velocity universal joint with the super-large operating angle can be achieved.

Figure 6A:
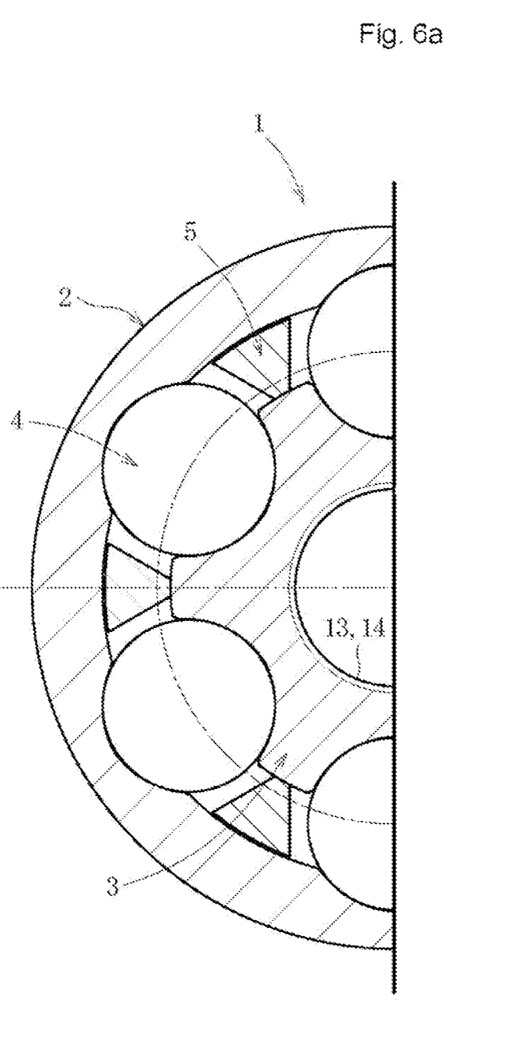
FIG. 6a is a view for illustrating a transverse cross section of the plunging type constant velocity universal joint according to this embodiment and FIG. 6b is a view for illustrating a transverse cross section of a related-art plunging type constant velocity universal joint for comparison.
Figure 6B:
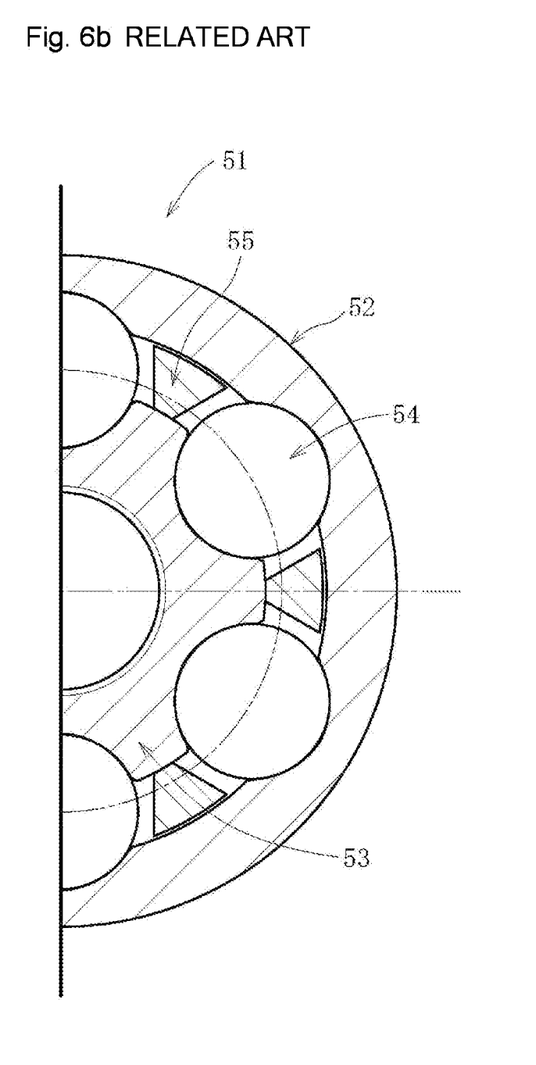

For visual supplementation with regard to the qualitatively different setting of the internal specifications described above, transverse cross sections of the plunging type constant velocity universal joint 1 according to this embodiment and the related-art product are illustrated in FIG. 6a and FIG. 6b for comparison. The plunging type constant velocity universal joint according to this embodiment is illustrated in FIG. 6a, and the related-art product is illustrated in FIG. 6b. Components of the related-art product corresponding to the plunging type constant velocity universal joint according to this embodiment are denoted by reference symbols which are obtained by adding 50 to the reference symbols used for this embodiment. As mentioned above, in the plunging type constant velocity universal joint 1 according to this embodiment forming the super-large operating angle, even when the downsizing is achieved, the outer diameter of the outer joint member 2, that is, the outer ring outer diameter $D_{OUTER}$ is larger by about one size (4% to 6%) than the related-art product, but is practically applicable.

Figure 7:
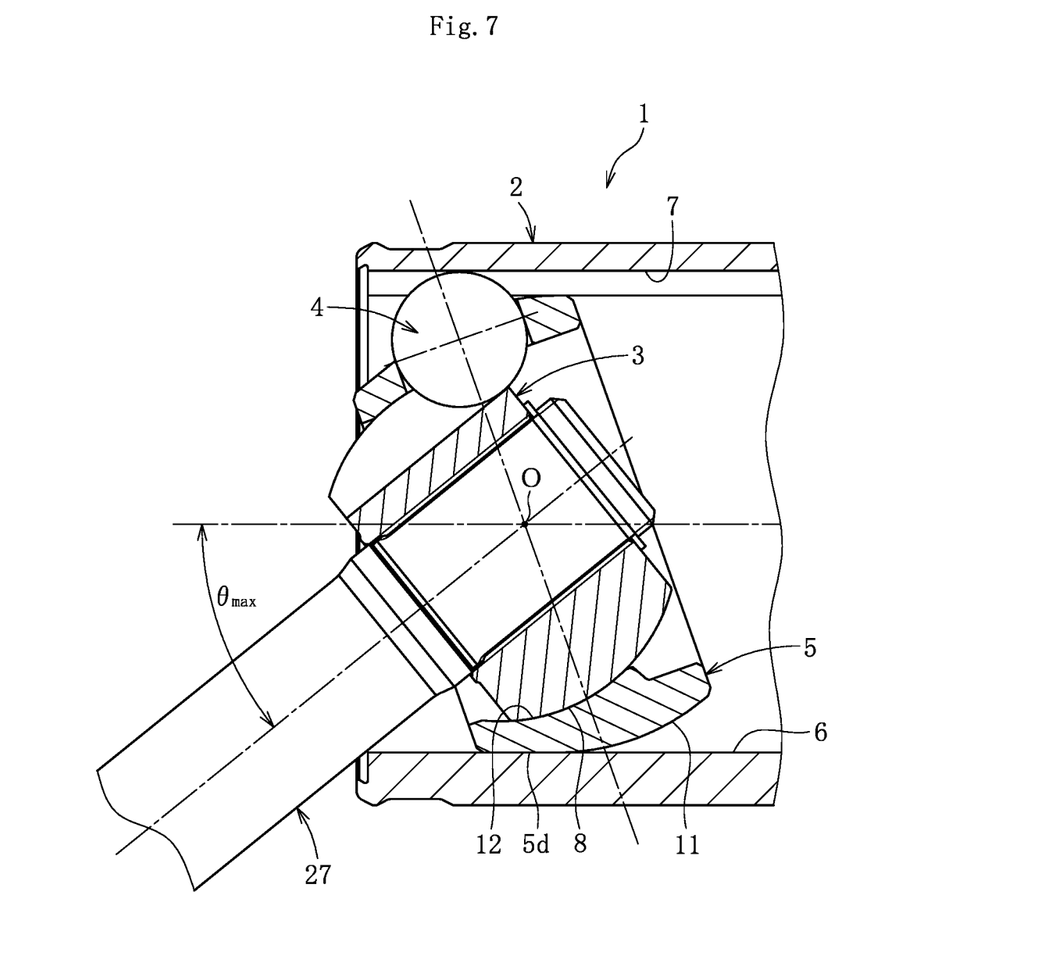
FIG. 7 is a longitudinal sectional view for illustrating a state in which the plunging type constant velocity universal joint of FIG. 1a forms a maximum operating angle.

FIG. 7 is an illustration of a state in which the plunging type constant velocity universal joint 1 according to this embodiment forms a maximum operating angle θmax. The stopper surface 5d of the cage 5 is brought into abutment against the cylindrical inner peripheral surface 6 of the outer joint member 2, thereby restricting the maximum allowable angle of the plunging type constant velocity universal joint with the super-large operating angle. The maximum operating angle θmax is 39°, thereby achieving the range of the operating angle of the fixed type constant velocity universal joint. In this embodiment, illustration is given of the example having the maximum operating angle θmax of 39°. However, the present invention is not limited to this, and is practicable with the maximum operating angle θmax within the range of from about 36° to about 42°.

Figure 8:
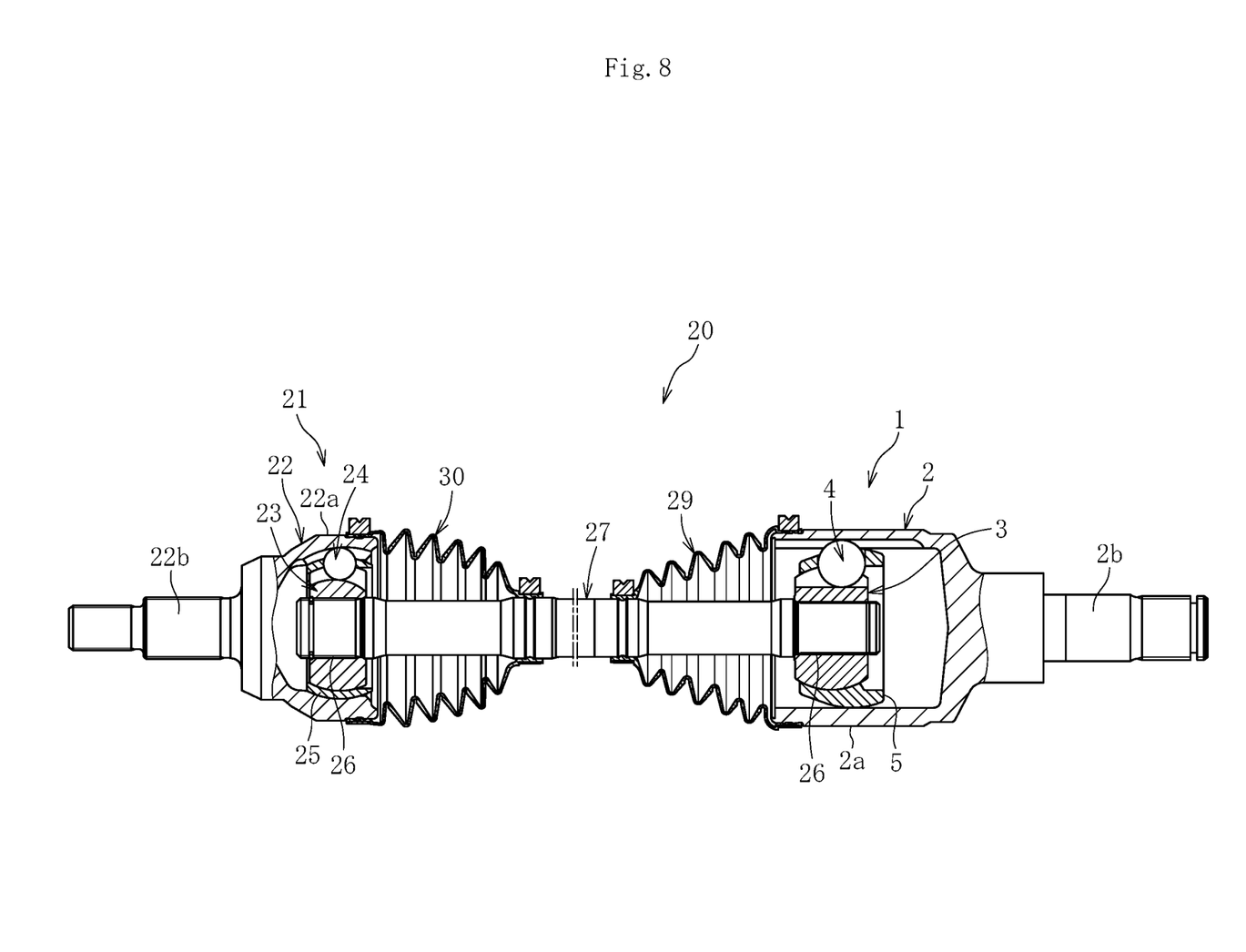
FIG. 8 is a longitudinal sectional view for illustrating a drive shaft to which the plunging type constant velocity universal joint of FIG. 1a is applied.

FIG. 8 is an illustration of the drive shaft 20 to which the plunging type constant velocity universal joint 1 according to this embodiment is applied. With regard to the drive shaft 20, a fixed type constant velocity universal joint 21 is coupled to one end of the intermediate shaft 27, and the plunging type constant velocity universal joint 1 according to this embodiment is coupled to another end of the intermediate shaft 27. The outer joint member 2 of the double-offset plunging type constant velocity universal joint 1 comprises a cup section 2a and a shaft section 2b extending in the axial direction from a bottom portion of the cup section 2a. The fixed type constant velocity universal joint 21 is a Rzeppa-type constant velocity universal joint using eight balls, and comprises an outer joint member 22, an inner joint member 23, balls 24, and a cage 25. The outer joint member 22 comprises a cup section 22a and a shaft section 22b extending in the axial direction from a bottom portion of the cup section 22a. The inner joint member 23 is received along an inner periphery of the cup section 22a of the outer joint member 22. The balls 24 are arranged between the outer joint member 22 and the inner joint member 23, and serve as torque-transmission elements. The cage 25 is arranged between a spherical inner peripheral surface of the outer joint member 22 and a spherical outer peripheral surface of the inner joint member 23, and is configured to retain the balls 24.

The intermediate shaft 27 has splines 26 for torque transmission on radially outer parts at both ends of the intermediate shaft 27. The spline 26 on the in-board side is spline-fitted to the inner joint member 3 of the plunging type constant velocity universal joint 1, thereby coupling the intermediate shaft 27 and the inner joint member 3 of the plunging type constant velocity universal joint 1 to each other in a torque-transmittable manner. Further, the spline 26 on the out-board side is spline-fitted to the inner joint member 23 of the fixed type constant velocity universal joint 21, thereby coupling the intermediate shaft 27 and the inner joint member 23 of the fixed type constant velocity universal joint 21 to each other in a torque-transmittable manner. Grease serving as a lubricant is sealed in each of the constant velocity universal joints 1 and 21. In order to prevent leakage of the grease to the outside and entry of a foreign matter from the outside of the joint, a bellows boot 29 is provided between the outer joint member 2 of the double-offset plunging type constant velocity universal joint 1 and the intermediate shaft 27, and a bellows boot 30 is provided between the outer joint member 22 of the fixed type constant velocity universal joint 21 and the intermediate shaft 27.

Through application of the plunging type constant velocity universal joint 1 according to this embodiment to the drive shaft, the usable range of the angle of the drive shaft is increased, and the degree of freedom in layout of drive system components is improved, thereby being capable of significantly contributing to increase in variation of designs of automobiles.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 plunging type constant velocity universal joint
2 outer joint member
3 inner joint member
4 torque transmission balls
5 cage
5a pocket
5d stopper surface
6 cylindrical inner peripheral surface
7 track groove
8 spherical outer peripheral surface
9 track groove
11 spherical outer peripheral surface
12 spherical inner peripheral surface
13 coupling hole
14 spline
$D_{BALL}$ ball diameter
$D_{OUTER}$ outer ring outer diameter
$PCD_{BALL}$ pitch circle diameter of ball
$D_S$ spline large diameter
F offset amount
O joint center
O1 curvature center
O2 curvature center
S inclination angle
$T_{CAGE}$ a minimum thickness of the cage
α ball contact angle
θmax maximum operating angle
Ψ ball contact ratio

The invention claimed is:

1. A plunging type constant velocity universal joint, comprising:
an outer joint member comprising a cylindrical inner peripheral surface having six linear track grooves extending along an axial direction;
an inner joint member comprising a spherical outer peripheral surface having six linear track grooves being opposed to the linear track grooves of the outer joint member and extending along the axial direction, the inner joint member having a coupling hole at a center portion thereof for coupling a shaft;
six torque transmission balls incorporated between the linear track grooves of the outer joint member and the linear track grooves of the inner joint member; and
a cage, which is configured to retain the torque transmission balls, and comprises a spherical outer peripheral surface and a spherical inner peripheral surface, which are guided in contact with the cylindrical inner peripheral surface of the outer joint member and the spherical outer peripheral surface of the inner joint member, respectively,
wherein a curvature center of the spherical outer peripheral surface of the cage and a curvature center of the spherical inner peripheral surface are offset toward opposite sides in the axial direction with respect to a joint center,
wherein a ratio $T_{CAGE}/D_{BALL}$ of a minimum thickness ($T_{CAGE}$) of the cage to a diameter ($D_{BALL}$) of the torque transmission balls is set within a range of from 0.225 to 0.245, the minimum thickness ($T_{CAGE}$) being measured along a line extending from the curvature center of the spherical inner peripheral surface of the cage through the cage,
wherein a ratio $D_{BALL}/D_S$ of the diameter ($D_{BALL}$) of the torque transmission balls to a spline large diameter ($D_S$) of the coupling hole of the inner joint member is set within a range of from 0.79 to 0.85, and
wherein a ball contact ratio (ψ) of the torque transmission balls, which is a ratio of a curvature radius of a transverse cross section of each of the linear track grooves to a radius of one of the torque transmission balls, is set within a range of from 1.08 to 1.12.

2. The plunging type constant velocity universal joint according to claim 1, wherein the plunging type constant velocity universal joint is configured to operate at a maximum angle that is equal to or larger than 39°.

3. The plunging type constant velocity universal joint according to claim 2, wherein the cage further comprises a stopper surface connected to the spherical outer peripheral surface, the stopper surface having an inclination angle (S) with respect to a line extending tangentially from the spherical outer peripheral surface at a point where another line, which passes through the joint center and is orthogonal to a central axis of the cage, intersects the spherical outer peripheral surface that is equal to or larger than 19.5°.

4. The plunging type constant velocity universal joint according to claim 1, wherein the cage further comprises a stopper surface connected to the spherical outer peripheral surface, the stopper surface having an inclination angle (S) with respect to a line extending tangentially from the spherical outer peripheral surface at a point where another line, which passes through the joint center and is orthogonal to a central axis of the cage, intersects the spherical outer peripheral surface that is equal to or larger than 19.5°.

* * * * *